(12) United States Patent
Larsson (10) Patent No.: US 11,936,978 B2
(45) Date of Patent: Mar. 19, 2024

(54) METHOD AND IMAGE-CAPTURING DEVICE FOR INSTALLING THE IMAGE-CAPTURING DEVICE ON A NETWORK

(71) Applicant: Axis AB, Lund (SE)

(72) Inventor: Fredrik Larsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/578,489

(22) Filed: Jan. 19, 2022

(65) Prior Publication Data
US 2022/0263997 A1 Aug. 18, 2022

(30) Foreign Application Priority Data
Feb. 16, 2021 (EP) .................................... 21157405

(51) Int. Cl.
| | |
|---|---|
| *H04N 5/232* | (2006.01) |
| *G06F 21/62* | (2013.01) |
| *H04N 7/18* | (2006.01) |
| *H04N 23/617* | (2023.01) |
| *H04N 23/661* | (2023.01) |
| *H04N 23/667* | (2023.01) |

(52) U.S. Cl.
CPC ....... *H04N 23/661* (2023.01); *G06F 21/6209* (2013.01); *H04N 7/183* (2013.01); *H04N 23/617* (2023.01); *H04N 23/667* (2023.01)

(58) Field of Classification Search
CPC .... H04N 23/661; H04N 7/183; H04N 23/617; H04N 23/667; H04N 23/60; H04N 7/181; H04N 21/234; H04N 21/25875; H04N 21/26291; G06F 21/6209; G06T 3/4015; G06T 7/13
USPC ......................................................... 348/143
See application file for complete search history.

(56) References Cited

U.S. PATENT DOCUMENTS

| | | | |
|---|---|---|---|
| 2016/0328627 A1 | 11/2016 | Fujii et al. | |
| 2018/0033151 A1 | 2/2018 | Matsumoto et al. | |
| 2018/0205876 A1* | 7/2018 | Paulus | H04N 23/62 |
| 2018/0205906 A1* | 7/2018 | Boyle | H04N 7/188 |
| 2019/0332871 A1* | 10/2019 | Sudarsan | G08B 13/19686 |
| 2020/0211348 A1 | 7/2020 | Wang | |
| 2021/0370879 A1* | 12/2021 | Julian | H04L 67/06 |
| 2021/0392116 A1* | 12/2021 | Hsu | G06V 40/161 |

FOREIGN PATENT DOCUMENTS

| | | | |
|---|---|---|---|
| EP | 3352456 A1 | 7/2018 | |
| EP | 3557864 A1 | 10/2019 | |
| WO | WO-2006058314 A2 * | 6/2006 | G01S 13/02 |
| WO | 2020/071996 A1 | 4/2020 | |

\* cited by examiner

*Primary Examiner* — Thai Q Tran
*Assistant Examiner* — Stephen R Smith
(74) *Attorney, Agent, or Firm* — XSENSUS LLP (57) ABSTRACT

A method, performed by an image-capturing device, for installing the image-capturing device on a network. The image-capturing device operates according to an installation mode in which a limited set of persistent software settings of the image-capturing device can be changed and an installation-mode video stream which is privacy safe is anonymously accessible. The method comprises providing the installation-mode video stream in response to connecting the image-capturing device to the network.

12 Claims, 6 Drawing Sheets

METHOD AND IMAGE-CAPTURING DEVICE FOR INSTALLING THE IMAGE-CAPTURING DEVICE ON A NETWORK

CROSS-REFERENCE TO RELATED APPLICATION

This application claims priority to European Patent Application No. 21157405.8, filed on Feb. 16, 2021, the disclosure of which is incorporated herein by reference in its entirety.

TECHNICAL FIELD

The embodiments herein relate to a method and an image-capturing device for installing the image-capturing device on a network. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

Physical installation of video cameras often requires an installer to access a video stream for proper direction and alignment of the video camera. The video stream may be accessed via an installing device which is connected to the video camera over some network. Currently, this may require the installer to have an account on the video camera. Setting up the account may be performed by the installing device. However, having a video stream accessible for anyone is generally seen as bad cyber security practice and is in some geographical areas regulated by law, e.g., California's Senate Bill no. 327. This law does not allow standardized passwords.

Document WO 2020/071996 A1 discloses a video camera may create an anonyrnized video stream by detecting people's faces, then anonymizing the faces by pixelating the faces . . . the outbound transmissions may be restricted to anonymized content . . . . The authorized users may provide credentials or have some other mechanism to gain access to the sensitive raw video feed. The devices may embed the anonymization routines into hardware or software such that a raw video feed may be unavailable when initially installed.

Document US 2018/033151 A1 a monitoring device including a video output controller that generates and outputs an output video in which the masking process is implemented only on an image region of a moving object set as a target of the masking process by the process target selector.

Document US 2016/328627 A1 discloses an imaging device including a moving image outputter that outputs a masking processed moving image on which the masking process is performed in a first output mode and outputs an unprocessed moving image on which the masking process is not performed in a second output mode, and a controller that switches the output mode of the moving image outputter according to an instruction of a user, in which the controller performs output mode initialization that sets the output mode to the first output mode at a booting of the device.

One way of accessing the video stream securely by the installer is by a) providing the video camera with a security feature that requires a user to generate a new means of authentication before access is granted to the video camera for the first time and b) using a preprogrammed password that is unique to each video camera manufactured.

However, this method is cumbersome to both the manufacturer and the installer and introduces security risks with regards to how handover of credentials is done.

SUMMARY

An object of embodiments herein may thus be to obviate some of the problems mentioned above, or at least reduce the impact of them. Specifically, an object may be to improve installation of an image-capturing device on a network while preserving personal integrity.

According to an aspect, the object is achieved by a method, performed by an image-capturing device, for installing the image-capturing device on a network. The image-capturing device operates according to an installation mode in which a limited set of persistent software settings of the image-capturing device can be changed and an installation-mode video stream which is privacy safe is anonymously accessible. The method comprises providing the installation-mode video stream in response to connecting the image-capturing device to the network.

According to another aspect, the object is achieved by an image-capturing device configured to perform the above method.

According to further aspects, the object is achieved by a computer program and a computer program carrier corresponding to the aspects above.

Although embodiments have been summarized above, the claimed subject matter is defined by the accompanying claims.

By providing a video stream which is privacy safe and anonymously accessible while the image-capturing device operates according to the installation mode the need to apply security measures that make sure that only trusted users can access the image-capturing device is reduced. In other words, by providing a video stream which contains enough information for the installer to properly direct and align the image-capturing device, but not enough to consider the image-capturing device operating under a law governing information privacy for connected devices embodiments herein simplify both the manufacturing of the image-capturing device and the installation, while personal integrity is preserved as the installation-mode video stream is privacy safe. For example, a need for a specific account for the installer is removed.

Since the installation mode allows only changes to be made to a limited set of persistent software settings a subsequent user of the image-capturing device can be sure that the image-capturing device has not been modified and/or tampered with in such a way that it affects a security state of the image-capturing device, e.g., in such a way that the image-capturing device poses a threat to a system that it will operate in.

A further advantage of embodiments herein is that they enable an improved focusing and aligning of the image-capturing device while personal integrity is preserved by intensifying the outline of objects in the installation-mode video stream. Since the intensity of the outline of objects in the installation-mode video stream is dependent on how well the installation-mode video stream is focused the installer can use this dependency to improve the focus of the installation-mode video stream.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

As mentioned above it may be of interest to improve installation of an image-capturing device on a network while preserving personal integrity.

One way of solving this problem is by providing an image-capturing device with an installation mode where an installation-mode video stream contains enough information for the installer to properly direct, e.g., by focusing and aligning, the image-capturing device, but not enough to consider the image-capturing device to operate under the nature and functionality of the device which would require authenticating a unique user with a unique password.

With the above solution the need for a specific account for the installer and/or the installing device is removed. The installation-mode video stream may be achieved by edge detection image processing, such as Sobel filtering, where only the outline of objects is shown in the video.

When the first account or authentication mechanism is setup the installation mode may be disabled.

In the installation mode a limited set of persistent software settings of the image-capturing device can be changed. This ensures that the image-capturing device has not been tampered with. In some embodiments herein persistent software settings comprises software settings that are persistent after a restart of the image-capturing device.

Persistent software settings that cannot be changed may relate to settings that change a security state of the image-capturing device. Thus, the limited set of persistent software settings that may be changed in the installation mode may be software settings that do not change the security state. Due to this a subsequent user of the image-capturing device can be sure that the image-capturing device has not been modified and/or tampered with in such a way that it has affected the security state of the image-capturing device, e.g., in such a way that the image-capturing device poses a threat to a system that it will operate in.

In some embodiments herein the limited set of persistent software settings that may be changed may relate to the installation mode. For example, in the installation mode the image-capturing device may disable the installation-mode video stream or the installation mode by changing software settings of the image-capturing device.

In some embodiments herein persistent software settings that cannot be changed may relate to a normal operating mode of the image-capturing device. The normal operating mode of the image-capturing device may be an operating mode in which authentication is required to access a video stream, e.g., to access a normal video stream. Software settings that affect the normal operating mode of the image-capturing device may also be changed in the installation mode, e.g., if they are irrelevant for the security. Thus, such settings may be changed if they do not change the security state of the image-capturing device. For example, in the installation mode it may be possible to change a bit that determines an orientation, e.g., up or down, of the image-capturing device 110 in the normal operating mode.

When a subsequent operator or user or user device accesses the image-capturing device via a password the subsequent operator or user or user device can be sure that no one has logged in to the image-capturing device before and changed properties of the image-capturing device.

Figure 1:
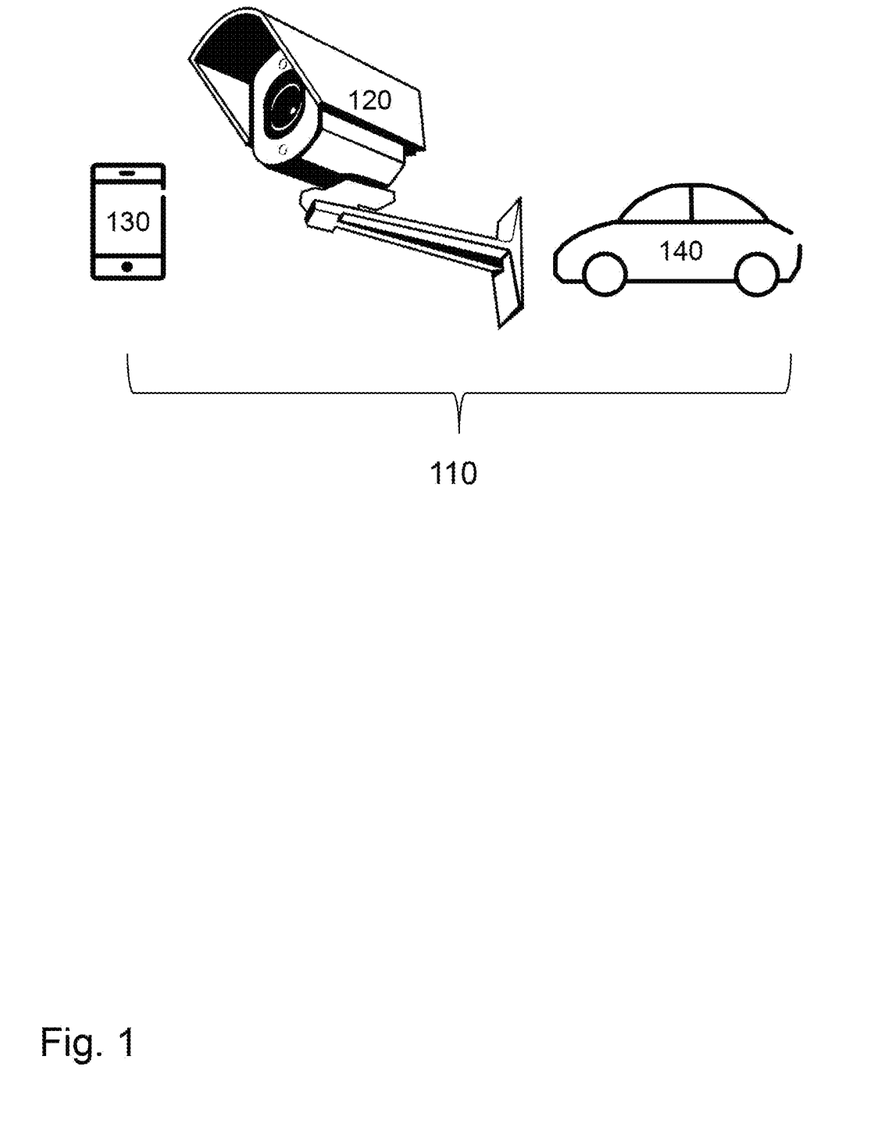
FIG. 1 illustrates exemplifying embodiments of image-capturing devices.

Embodiments herein may be implemented in one or more image-capturing devices, e.g. a digital camera. FIG. 1 depicts various exemplifying image-capturing devices 110. The image-capturing device 110 may e.g., be or comprise any of a camcorder, a network video recorder, a camera, a video camera 120 such as a surveillance camera or a monitoring camera, a digital camera, a wireless communication device 130, such as a smartphone, including an image sensor, or a car 140 including an image sensor.

Figure 2A:
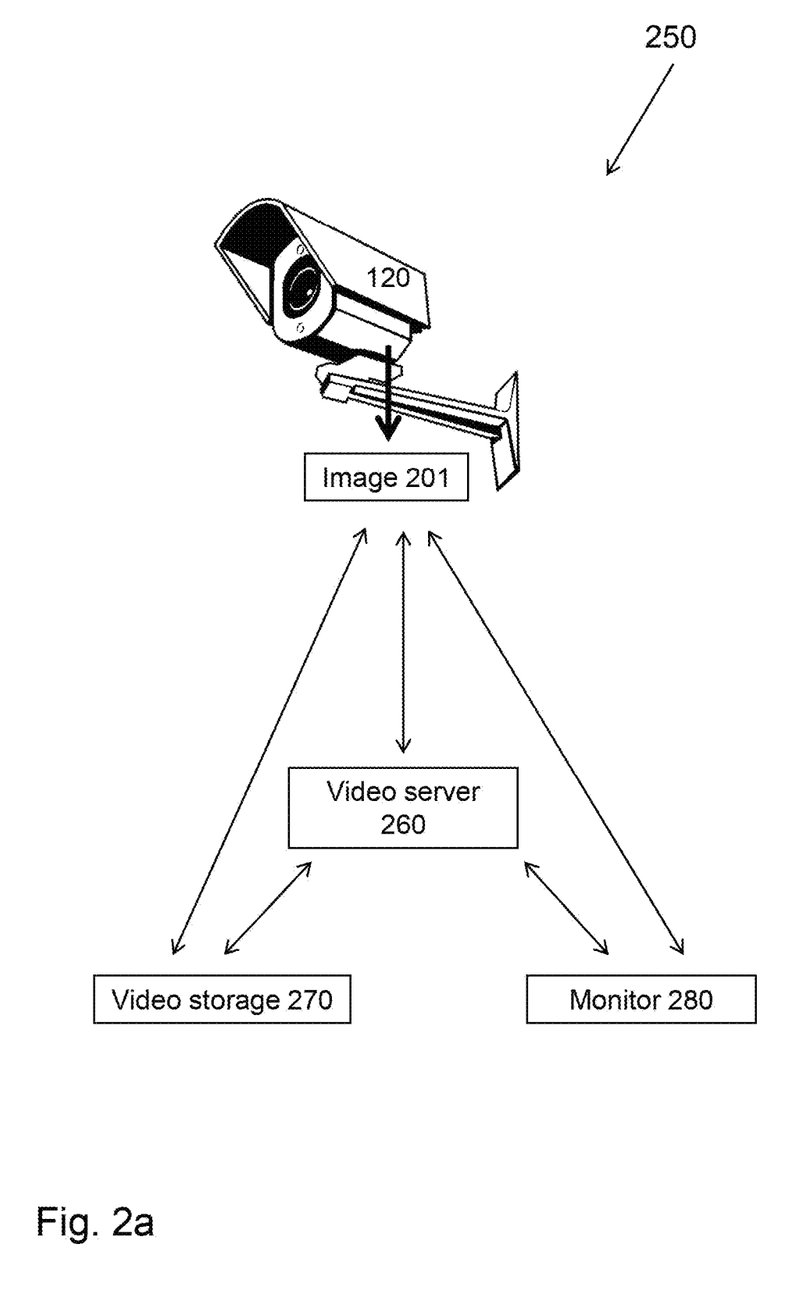
FIG. 2a illustrates exemplifying embodiments of a video network system.

FIG. 2a depicts an exemplifying video network system 250 in which embodiments herein may be implemented. The video network system 250 may include the video camera 120 which can capture and perform image processing on a digital image 201, such as a digital video image. A video server 260 in FIG. 2a may obtain the image, for example from the video camera 120 over a network or the like, which is indicated in FIG. 2a with the double-pointing arrows.

A video server is a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. Today, many video server functions may be built-in in the video camera 120.

However, in FIG. 2a, the video server 260 is connected over the video network system 250, to the image-capturing device 110 exemplified by the video camera 120. The video server 260 may further be connected to a video storage 270 for storage of video images, and/or connected to a monitor 280 for display of video images. In some embodiments the video camera 120 is connected directly with the video storage 270 and/or the monitor 280, as indicated by the direct arrows between these devices in FIG. 2a. In some other embodiments the video camera 120 is connected to the video storage 270 and/or the monitor 280 via the video server 260, as indicated by the arrows between the video server 260 and the other devices.

In order to better understand embodiments herein an imaging system will first be described.

Figure 3:
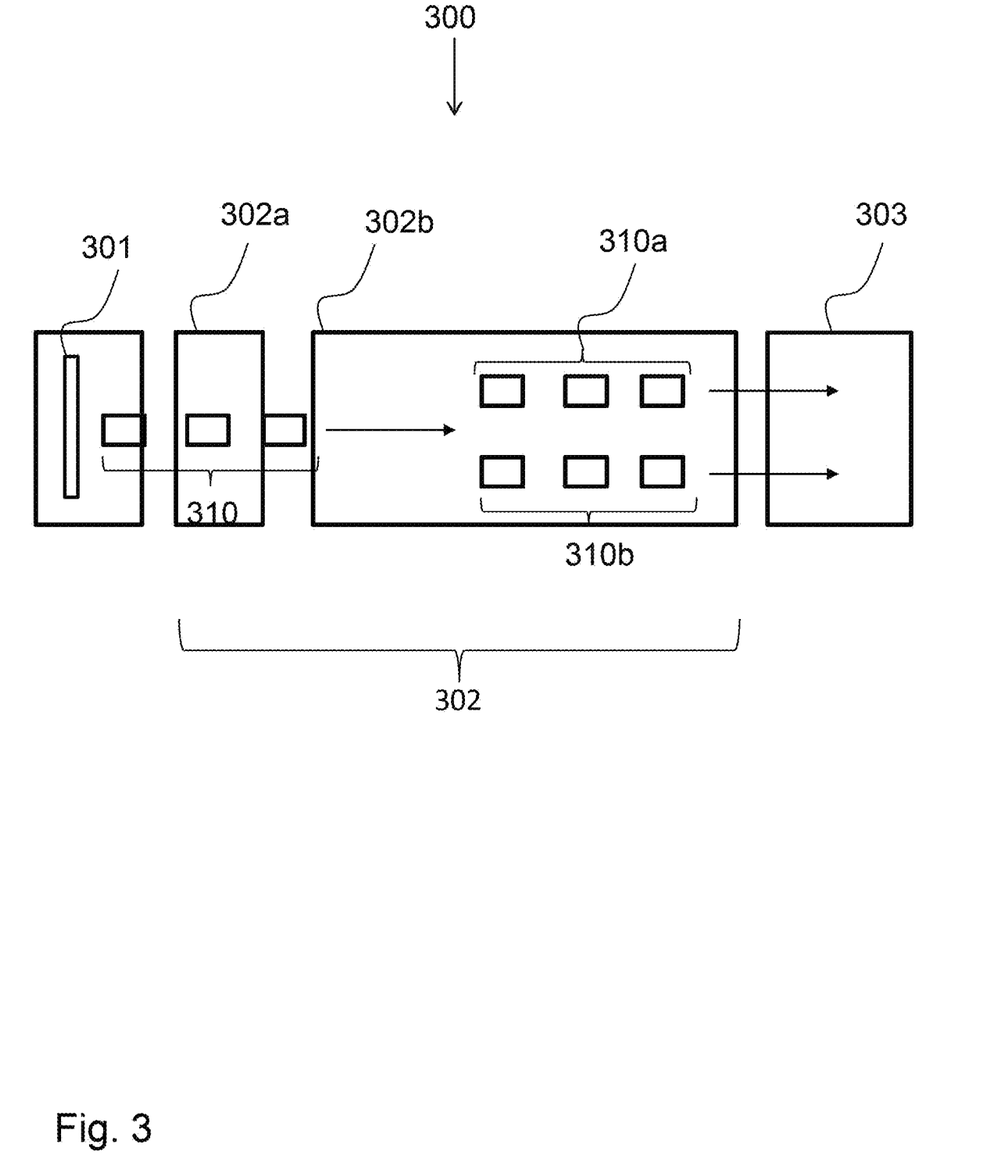
FIG. 3 is a schematic overview illustrating exemplifying embodiments of an imaging system.

FIG. 3 is a schematic view of an imaging system 300, in this case of a digital video camera, such as the video camera

120. The imaging system images a scene on an image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensors 301a, 301b, different image processing actions may be performed by an image processing pipeline 302. The image processing pipeline 302 may comprise an image processing part 302a and a video post-processing part 302b.

Typically for video processing the images are comprised in a stream of images. FIG. 3 illustrates a first video stream 310 from the image sensor 301.

Image processing may comprise demosaicing, color correction, noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rectification and rotation), flat-field correction (e.g., for removal of the effects of vignetting), application of overlays (e.g., privacy masks, explanatory text), etc. The image processing pipeline 302 may also be associated with an analytics engine performing object detection, recognition, alarms, etc.

The image processing part 302a may e.g. perform image stabilization, apply noise filtering, distortion correction, global and/or local tone mapping, transformation, and flat-field correction. The video post-processing part 302b may for example crop parts of an image, apply overlays, and comprise the analytics engine.

Specifically, in embodiments herein processing of the first video stream 310 may comprise intensifying an outline of objects in the first video stream 310. Intensifying the outline of objects may comprise applying an edge detection filter, such as a Sobel filter, to the first video stream 310. Applying the edge detection filter the first video stream 310 may be performed in the video post-processing part 302b.

Following the image processing pipeline 302 the image may be forwarded to an encoder 303, wherein the information in the image frames is coded according to an encoding protocol, such as H.264, and forwarded to for example a receiving client, exemplified here with the monitor 280, to the video server 260, the storage 270, etc.

Figure 2B:
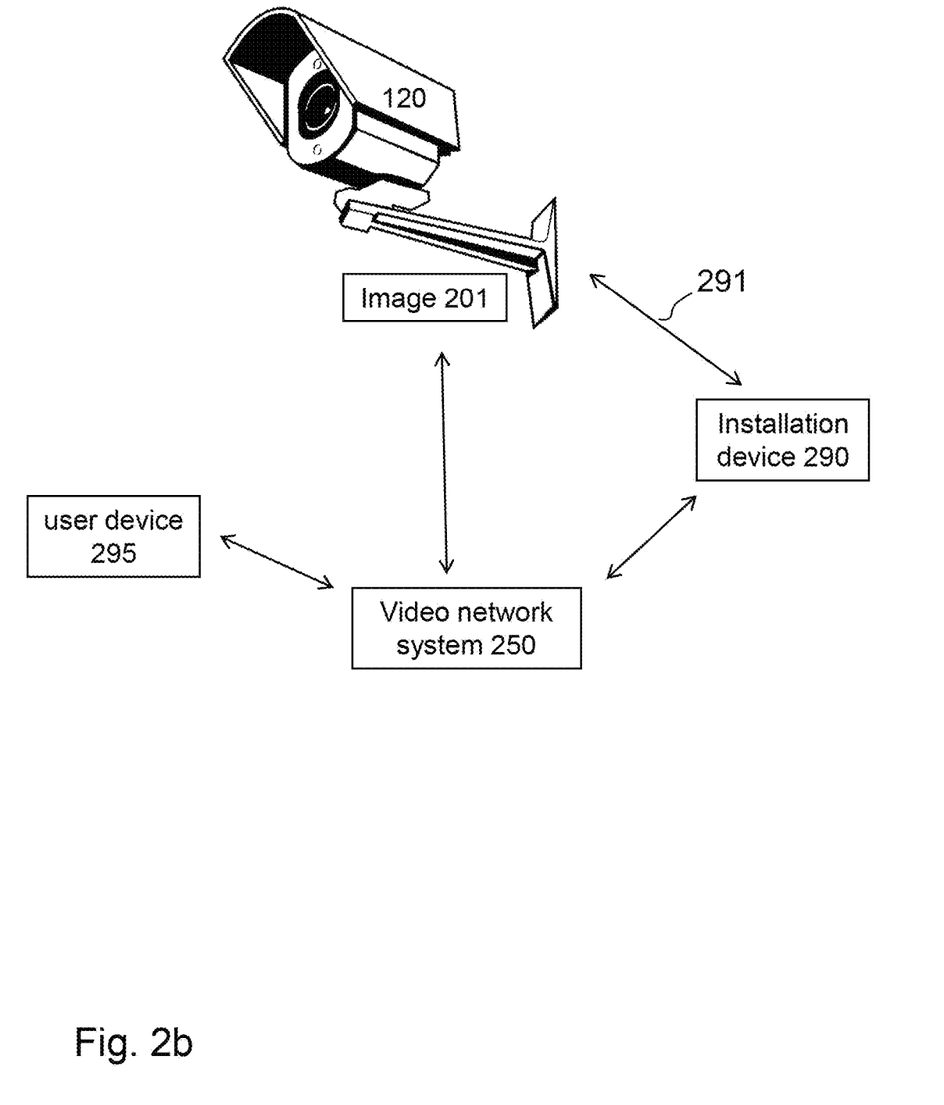
FIG. 2b illustrates exemplifying embodiments of a video network system, an installing device and a user device.
Figure 4:
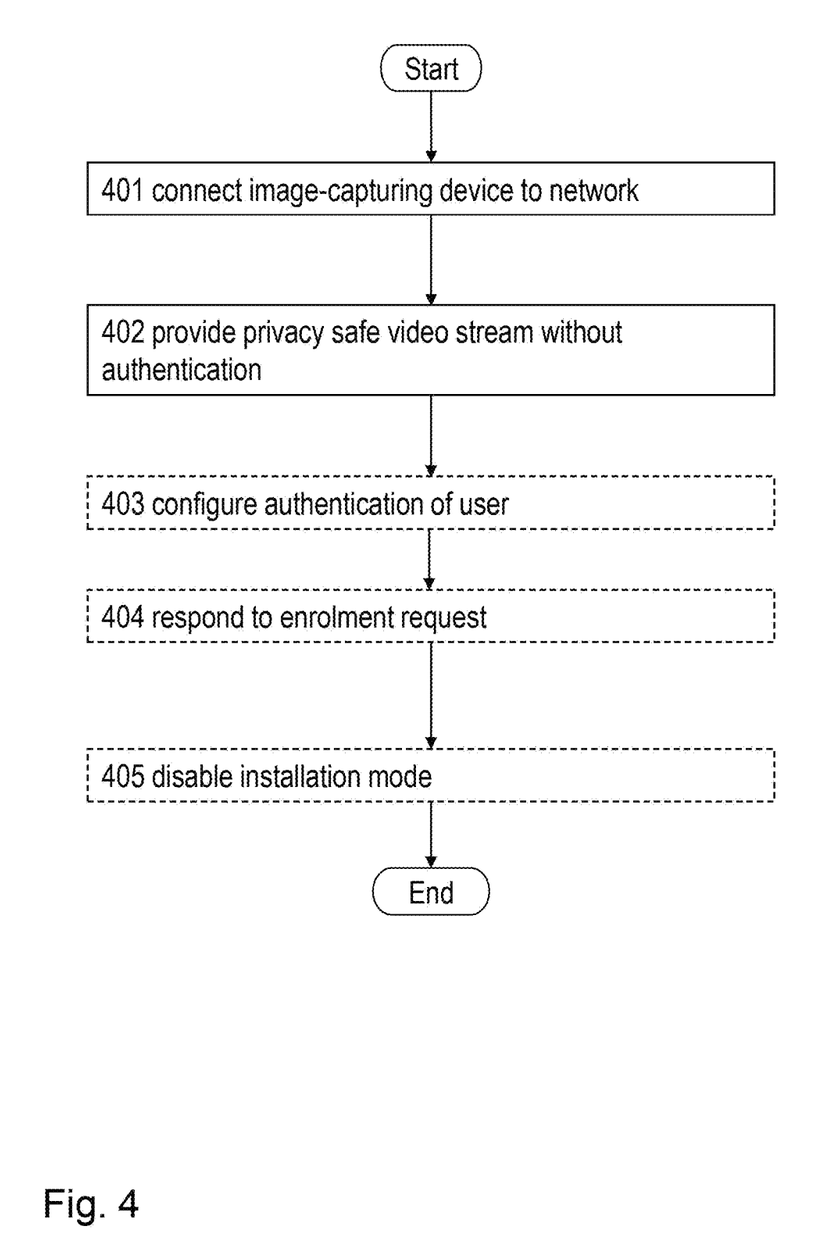
FIG. 4 is a flowchart illustrating embodiments of a method in an image-capturing device.

Exemplifying embodiments herein will now be described with reference to FIGS. 2b and 4 and with further reference to FIGS. 1, 2a and 3. FIG. 4 illustrates a flowchart describing a method, performed by the image-capturing device 110, for installing the image-capturing device 110 on the video network system 250. FIG. 2b illustrates the video camera 120 and the video network system 250 according to FIG. 2a and further illustrates an installation device 290 which may be used during the installation of the image-capturing device 110, such as the video camera 120. The installation device 290 may be connected to the image-capturing device 110 via either the video network system 250, e.g., via the video server 260, or via a second connection or network 291. When the installation device 290 is connected to the image-capturing device 110 via the video network system 250 it may be connected directly to the image-capturing device 110 or via the video server 260. The second connection or network 291 may be a short-range wireless network or connection. Examples of such are connections and networks using Bluetooth, Wifi or similar communication protocols.

The method for installing the image-capturing device 110 on the video network system 250 may be implemented in any of the image-capturing devices 110 of FIG. 1, and in particular the video camera 120 of FIGS. 1 and 2.

One or more of the following actions presented in FIG. 4 may be performed in the following exemplifying order. In other examples, the order may differ from what is described below.

The image-capturing device 110 operates according to an installation mode in which a limited set of persistent software settings of the image-capturing device 110 can be changed and an installation-mode video stream 310a which is privacy safe is anonymously accessible.

As mentioned above persistent software settings that cannot be changed may relate to settings that change a security state of the image-capturing device 110. Thus, the limited set of persistent software settings that may be changed in the installation mode may be software settings that do not change the security state. Due to this a subsequent user of the image-capturing device 110 can be sure that the image-capturing device 110 has not been modified and/or tampered with in such a way that it has affected the security state of the image-capturing device 110, e.g., in such a way that the image-capturing device 110 poses a threat to a system that it will operate in.

In some embodiments herein persistent software settings that cannot be changed may relate to a normal operating mode of the image-capturing device 110. The normal operating mode of the image-capturing device 110 may be an operating mode in which authentication is required to access a video stream, e.g., to access a normal video stream such as a second video stream 310b which is not privacy safe, i.e., a non-privacy safe video stream 310b.

The limited set of persistent software settings that may be changed may relate to the installation mode. For example, in the installation mode the image-capturing device 110 may disable the installation-mode video stream 310a or the installation mode by changing software settings of the image-capturing device 110.

The installation-mode video stream 310a may be accessible without authenticating the user, or the user device 295, of the image-capturing device 110. Privacy safe may imply that privacy of persons in the video is respected. The privacy safe installation-mode video stream 310a may be implemented such that identification of persons in the installation-mode video stream 310 is made difficult. Further details of how to implement the installation-mode video stream 310a as privacy safe will be given below in action 402.

Further, in the installation mode the image-capturing device 110 does not allow access to the non-privacy safe video stream 310b, i.e., the second video stream 310b which is not privacy safe. Instead, in the installation mode the image-capturing device 110 may allow access only to the installation-mode video stream 310a. That is, in the installation mode the image-capturing device 110 may not allow access to other video streams than the installation-mode video stream 310a.

By providing the installation-mode video stream 310a which contains enough information for the installer to properly install the image-capturing device 110, e.g., to direct and align the image-capturing device 110, but not enough to consider the image-capturing device 110 operating under a law governing information privacy for connected devices, embodiments herein simplify both the manufacturing of the image-capturing device 110 and the installation, while personal integrity is preserved as the installation-mode video stream 310a is privacy safe. For example, a need for a specific account for the installer and/or the installing device 290 is removed.

Action 401

In order to install the image-capturing device 110 the image-capturing device 110 may connect the image-capturing device 110 to the video network system 250. The connecting may be performed by announcing itself as accessible on the video network system 250. The announcement may be performed by sending an announcement message to a multi-cast address, e.g., by sending multi-cast packets on the network, that multiple other devices can listen to. Simple Service Discovery Protocol (SSDP) may be used as a network protocol, e.g., for announcement and discovery of network services and presence information. More specifically multi-cast SSDP may be used for connecting the image-capturing device 110 to the video network system 250. Once the image-capturing device 110 has connected to the video network system 250 it is for example possible to discover the image-capturing device 110 and connect a web browser to it via an Internet-Protocol address which has been announced.

Action 402

As mentioned above, when the image-capturing device 110 operates according to the installation mode the image-capturing device 110 provides the installation-mode video stream 310a. In some embodiments herein the image-capturing device 110 provides the installation-mode video stream 310a in response to connecting the image-capturing device 110 to the video network system 250. The installation-mode video stream 310a is provided in order to install the image-capturing device 110, e.g., on the video network system 250. Providing the installation-mode video stream 310a may comprise providing it to the video network system 250. For example, the image-capturing device 110 may provide the installation-mode video stream 310a to the installation device 290 over the video network system 250, e.g., via the video server 250.

By displaying and viewing the provided installation-mode video stream 310a the installer is able to, for example, align and focus the image-capturing device 110.

In some other embodiments herein the image-capturing device 110 provides the installation-mode video stream 310a to the installation device 290 used for installing the image-capturing device 110, without using the video network system 250 to transfer the installation-mode video stream 310. Such installation may be performed over the second connection or network 291 between the image-capturing device 110 and the installation device 290. Thus, the installation may also be performed over the second network 291 which differs from the video network system 250 which is used for providing the non-privacy safe video stream 310b to the operator of the image-capturing device 110. By providing the installation-mode video stream 310a to the installing device 290 over the short-range wireless network or connection 291 the security is increased since the installation mode video-stream 310a is less available to other devices, such as network devices, than the installing device 290. For example, by providing the installation-mode video stream 310a to the installing device 290 over the short-range wireless network or connection only devices in a vicinity of the image-capturing device 110 are able to receive the installation-mode video stream 310a.

In some embodiments herein providing the installation-mode video stream 310a comprises generating the installation-mode video stream 310a by image processing the first video stream 310. Image processing the first video stream 310 may comprise intensifying an outline of objects in the first video stream 310. Intensifying the outline of objects may comprises applying an edge detection filter, such as a Sobel filter.

Image processing the first video stream 310 may further comprise removing pixel information and/or masking pixel information in order to generate the privacy safe installation-mode video stream 310a. For example, the masked pixel information may comprise information relating to objects or persons. Image processing the first video stream 310 may comprise a combination of intensifying the outline of objects and removing pixel information and/or masking pixel information.

In some embodiments herein the installation-mode video stream 310a is provided with a lower frame rate or a lower bitrate than a normal video stream that is provided to authenticated users and/or user devices 295 after installation. Providing the installation-mode video stream 310a with a lower frame rate or a lower bitrate is advantageous for making adjustments of the images. When the installation-mode video stream 310a is provided with a lower frame rate the installation-mode video stream 310a may be accessible during a limited time, e.g., a limited time after it is powered up. When the installation-mode video stream 310a is provided with a lower frame and/or lower bitrate the installation-mode video stream 310a may not need to be anonymized, e.g., since the accessibility is limited in time and the frame rate or bitrate is limited. Thus, it may be assumed that it is clear for the installer that the installation-mode video stream 310a is not a normal video stream.

In some embodiments an image frame of the installation-mode video stream 310a comprises a first number of blocks in a middle region of the image frame for focusing the installation-mode video stream 310a and a second number of blocks in a corner for alignment of the image-capturing device 110. Alignment of the image-capturing device 110 may be required if the image-capturing device 110 is not equipped with a motor to steer it.

Action 403

When the installation of the image-capturing device 110 is finished the image-capturing device 110 is ready to be used, e.g., by authenticated users and/or user devices, such as a user device 295 illustrated in FIG. 2b. In order to enroll the image-capturing device 110 the user and/or user device 295 may configure authentication of the user on the image-capturing device 110. Thus, the image-capturing device 110 may participate in the configuration of the authentication of the user and/or user device 295. Configuring authentication may comprise setting up an account of the user, and/or user device 295, on the image-capturing device 110. The account may be defined by a unique password associated with a unique username. Setting up the account by the image-capturing device 110 may comprise receiving an account configuration request from the user device 295 including the unique username and the unique password. The image-capturing device 110 may save the unique username and the unique password and associate them with the account. As described below in action 404, the image-capturing device 110 may further respond to the account configuration request.

With the account the user and/or user device 295 is able to log on to the image-capturing device 110 by sending the unique username and the unique password for each request to the image-capturing device 110.

As an alternative to configuring the authentication by setting up an account on the image-capturing device 110 itself it is also possible to configure the authentication with an external trusted system or device for user administration. Examples of such external systems for user administration are Lightweight Directory Access Protocol (LDAP) and Active Directory (AD). The external system for user administration may keep track of accounts, users and passwords. A user may authenticate itself towards the image-capturing device 110 by interacting with the external system for user administration which then allows authenticated users to access the image-capturing device.

However, it is also possible to authenticate the user and/or user device 295 by other means such as tokens or certificates and still other alternatives.

Action 404

Configuring the authentication of the user and/or user device 295 may further comprise the image-capturing device 110 responding to the account configuration request from the user device 295. The response may indicate that the account configuration request has been granted.

The response may also comprise an indication of a state, such as a signed state, of the image-capturing device 110. The state of the image-capturing device 110 may be a security state.

For example, the response may comprise an indication that the signed state of the image-capturing device 110 is a factory state. Determining the security state of the image-capturing device 110 may be based on any part of the image-capturing device 110, such as content of a flash memory. Which and how many parts that are used for determining the security state may depend on the required confidence level. The security state may be used for determining whether or not the image-capturing device 110 has been amended in such a way that it poses a security threat to the system that it will operate in. This may mean that whatever the operating mode of the image-capturing device 110, e.g., whatever the behaviour is of the image-capturing device 110, persistent software settings which change the security state has not been changed from the factory settings. For example, even if a maleficent user manages to put the image-capturing device 110 in the installation mode after using the image-capturing device 110 the signed state may have changed. This is because an irreversible and measurable operation may have been performed, e.g., by increasing a monotonic counter or permanently erasing a secret.

In some embodiments herein the response may also comprise an indication of the operating mode of the image-capturing device 110. For example, the response may also comprise an indication that the image-capturing device 110 operates according to the installation mode.

Thus, the authentication of the user may further comprise verifying a signed security state or an operating mode of the image-capturing device 110.

Action 405

When the installation of the image-capturing device 110 is finished the image-capturing device 110 may disable the image-capturing device 110 from providing the installation-mode video stream 310a and/or it may provide the second video stream 310b.

In some embodiments herein the image-capturing device 110 disables the installation mode and/or changes its operating state or mode in order to disable the image-capturing device 110 from providing the installation-mode video stream 310a and/or to provide the second video stream 310b. For example, the image-capturing device 110 may change its operating mode from the installation mode to the normal operating mode in which the second video stream 310b is accessible.

In some further embodiments herein disabling the installation mode comprises disabling the image-capturing device 110 from providing the installation-mode video stream 310a. In yet some further embodiments herein disabling the installation mode comprises enabling access to the second video stream 310b which is not privacy safe to the authenticated user of the image-capturing device 110. A combination of the above two embodiments is also possible such that disabling the installation mode comprises both disabling the image-capturing device 110 from providing the installation-mode video stream 310a and enabling access to the second video stream 310b.

In some embodiments herein the image-capturing device 110 disables the image-capturing device 110 from providing the installation-mode video stream 310a and/or provides the second video stream 310b in response to configuring authentication of the user.

In some embodiments herein the image-capturing device 110 changes its operating state or mode in response to configuring authentication of the image-capturing device 110. For example, in some embodiments herein the image-capturing device 110 disables the installation mode in response to configuring authentication of the user.

In some other embodiments herein the installation-mode video stream 310a may be disabled without using the account. For example, the image-capturing device 110 may disable the installation-mode video stream 310a without using the account, e.g., without configuring the account, and/or without configuring authentication. Thus, the image-capturing device 110 may disable the installation-mode video stream 310a without receiving the request to configure authentication of the user and/or user device 295, and/or without the further request to log on to the image-capturing device 110. For example, the image-capturing device 110 may disable the installation-mode video stream 310a by receiving a command to disable the installation-mode video stream 310a over the short-range wireless network or connection 291, or by detecting a user interface input on the image-capturing device 110 indicating the command to disable the installation-mode video stream 310a, such as a touch screen input of the image-capturing device 110 or an input via a button of the image-capturing device 110.

In yet some other embodiments herein the operating mode may be changed without using the account. For example, the image-capturing device 110 may disable the installation mode without using the account, e.g., without configuring the account, and/or without configuring authentication. Thus, the image-capturing device 110 may disable the installation mode without receiving the request to configure authentication of the user and/or user device 295, and/or without the further request to log on to the image-capturing device 110. For example, the image-capturing device 110 may disable the installation mode by receiving a command to disable the installation mode over the short-range wireless network or connection 291, or by detecting a user interface input indicating the command to disable the installation mode, such as a touch screen input of the image-capturing device 110 or an input via a button of the image-capturing device 110.

Figure 5:
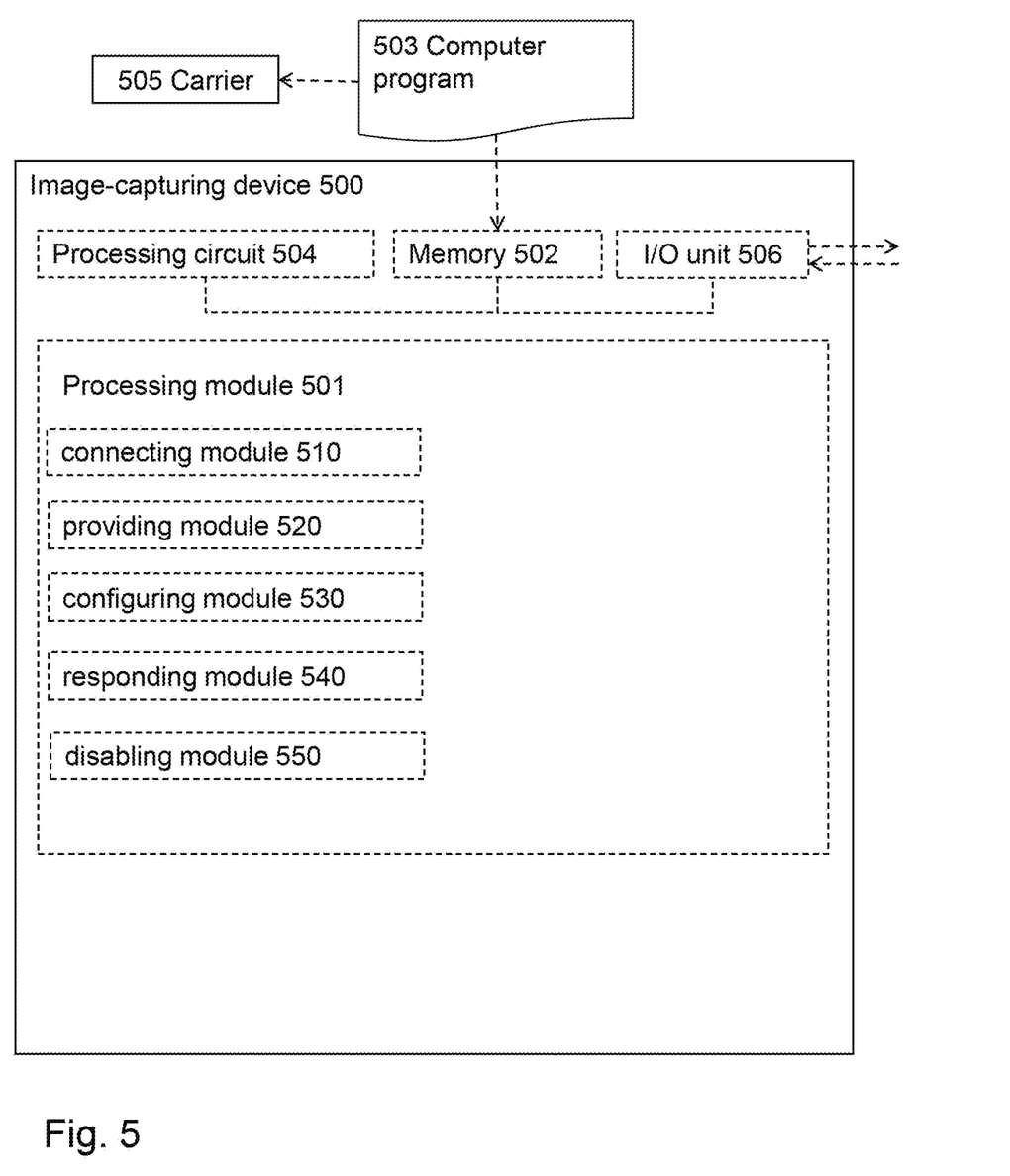
FIG. 5 is a block diagram illustrating embodiments of the image-capturing device.

With reference to FIG. 5, a schematic block diagram of embodiments of an image-capturing device 500 is shown. As mentioned above, the image-capturing device 500 is configured to operate according to the installation mode, in which a limited set of persistent software settings of the image-capturing device 500 can be changed and the installation-mode video stream 310a which is privacy safe is anonymously accessible.

The image-capturing device 500 may be configured to install the image-capturing device 500 on the video network system 250. As mentioned above, the image-capturing device 500 may comprise any of the camera, the video camera 120, the surveillance camera, the monitoring camera or the camcorder, the network video recorder, and the wireless communication device 130.

The image-capturing device 500 may comprise a processing module 501, such as a means for performing the methods described herein. The means may be embodied in the form of one or more hardware modules and/or one or more software modules.

The image-capturing device 500 may further comprise a memory 502. The memory may comprise, such as contain or store, instructions, e.g. in the form of a computer program 503, which may comprise computer readable code units which when executed on the image-capturing device 500 causes the image-capturing device 500 to perform the method of installing the image-capturing device 500, e.g. on the video network system 250.

According to some embodiments herein, the image-capturing device 500 and/or the processing module 501 comprises a processing circuit 504 as an exemplifying hardware module, which may comprise one or more processors. Accordingly, the processing module 501 may be embodied in the form of, or 'realized by', the processing circuit 504. The instructions may be executable by the processing circuit 504, whereby the image-capturing device 500 is operative to perform the methods of FIG. 4 as described above. As another example, the instructions, when executed by the image-capturing device 500 and/or the processing circuit 504, may cause the image-capturing device 500 to perform the methods according to FIG. 4.

In view of the above, in one example, there is provided an image-capturing device 500 for installing the image-capturing device 500, e.g. on the video network system 250. Again, the memory 502 contains the instructions executable by said processing circuit 504 whereby the image-capturing device 500 is operative for performing the method according to FIG. 4: in response to connecting the image-capturing device 500 to the video network system 250, providing the installation-mode video stream 310a.

The image-capturing device 500 may further be operative to perform the methods according to the detailed embodiments described above in connection to FIG. 4.

FIG. 5 further illustrates a carrier 505, or program carrier, which comprises the computer program 503 as described directly above. The carrier 505 may be one of an electronic signal, an optical signal, a radio signal and a computer readable medium.

In some embodiments, the image-capturing device 500 and/or the processing module 501 may comprise one or more of a connecting module 510, a providing module 520, a configuring module 530, a responding module 540, and a disabling module 550, as exemplifying hardware modules. In other examples, one or more of the aforementioned exemplifying hardware modules may be implemented as one or more software modules.

Moreover, the processing module 501 may comprise an Input/Output unit 506. According to an embodiment, the Input/Output unit 506 may comprise an image sensor configured for capturing the images described above such as the images comprised in the first video stream 310 from the image sensor 301.

Accordingly, the image-capturing device 500 is configured for installing the image-capturing device 500, e.g. on the video network system 250.

Therefore, according to the various embodiments described above, the image-capturing device 500 and/or the processing module 501 and/or the connecting module 510 is configured for connecting the image-capturing device 500 to the video network system 250.

The image-capturing device 500 and/or the processing module 501 and/or the providing module 520 is configured for providing the installation-mode video stream 310a, e.g. in response to connecting the image-capturing device 500 to the video network system 250. The installation-mode video stream 310a may be provided to the video network system 250.

In some embodiments providing the installation-mode video stream 310a comprises generating the installation-mode video stream 310a by image processing the first video stream 310. Then image processing the first video stream 310 may comprise intensifying the outline of objects in the first video stream 310, such as applying the edge detection filter.

The image-capturing device 500 and/or the processing module 501 and/or the configuring module 530 may be configured for configuring authentication of the user of the image-capturing device 500. In some embodiments configuring authentication of the user comprises setting up an account of the user on the image-capturing device 500.

The image-capturing device 500 and/or the processing module 501 and/or the responding module 540 may be configured for responding to the account configuration request from the user.

The image-capturing device 500 and/or the processing module 501 and/or the disabling module 550 may be configured for disabling 405 the installation mode in response to the configuring of the authentication of the user.

Disabling the installation mode may comprise disabling the image-capturing device 110 from providing the installation-mode video stream 310a, and/or enabling access to the second video stream 310b which is not privacy safe to the authenticated user of the image-capturing device 500.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image-capturing device, for installing the image-capturing device on a video network, the method comprising:
   operating the image-capturing device according to an installation mode in which a limited set of persistent software settings of the image-capturing device can be changed while persistent software settings that do change the security state of the image-capturing device cannot be changed in the installation mode, and
   in response to connecting the image-capturing device to the video network during the installation mode, providing a privacy safe installation-mode video stream to install the image-capturing device on the video network, such that the privacy safe installation-mode video stream is anonymously accessible without performing a user authentication,
   wherein the privacy safe installation-mode video stream is generated by image processing a first video stream such that a person in the first video stream is anonymized in the privacy safe installation-mode video stream, and
   wherein the limited set of persistent software settings that can be changed in the installation mode relate to the installation mode.

2. The method according to claim 1, wherein the limited set of persistent software settings that can be changed in the installation mode disable the installation-mode video stream or the installation mode.

3. The method according to claim 1, wherein persistent software settings that cannot be changed in the installation mode relate to an operating mode of the image-capturing device in which an operating mode authentication is required to access a video stream which is not privacy safe.

4. The method according to claim 1, wherein the security state determines whether or not the image-capturing device has been amended in such a way that it poses a security threat to the network.

5. The method according to claim 1, wherein the security state is a factory state which indicates that persistent software settings which change the security state has not been changed from the factory settings.

6. The method according to claim 1, wherein the security state is a signed state.

7. The method according to claim 1, wherein in the installation mode the image-capturing device does not allow access to a video stream which is not privacy safe.

8. The method according to claim 1, further comprising:
   configuring authentication of a user of the image-capturing device, and
   disabling the installation mode in response to configuring authentication of the user,
   wherein disabling the installation mode comprises disabling the image-capturing device from providing the installation-mode video stream, or enabling access to a second video stream which is not privacy safe to the authenticated user of the image-capturing device.

9. The method according to claim 1, wherein providing the installation-mode video stream comprises providing the privacy safe installation-mode video stream to the network.

10. An image-capturing device comprising:
    circuitry configured to:
    operate the image-capturing device according to an installation mode in which a limited set of persistent software settings of the image-capturing device can be changed while persistent software settings that do change the security state of the image-capturing device cannot be changed in the installation mode, and
    in response to connecting the image-capturing device to the video network during the installation mode, provide a privacy safe installation-mode video stream to install the image-capturing device on the video network, such that the privacy safe installation-mode video stream is anonymously accessible without performing a user authentication,
    wherein the privacy safe installation-mode video stream is generated by image processing a first video stream such that a person in the first video stream is anonymized in the privacy safe installation-mode video stream, and wherein the limited set of persistent software settings that can be changed in the installation mode relate to the installation mode.

11. The image-capturing device according to claim 10, comprising any of a camera, a video camera, a surveillance camera, a monitoring camera or a camcorder, a network video recorder, or a wireless communication device.

12. A non-transitory computer readable storage device having stored therein a computer program, comprising computer readable code units which when executed on an image-capturing device causes the image-capturing device to perform a method for installing the image-capturing device on a network, the method comprising:
  operating the image-capturing device according to an installation mode in which a limited set of persistent software settings of the image-capturing device can be changed while persistent software settings that do change the security state of the image-capturing device cannot be changed in the installation mode, and
  in response to connecting the image-capturing device to the video network during the installation mode, providing a privacy safe installation-mode video stream to install the image-capturing device on the video network, such that the privacy safe installation-mode video stream is anonymously accessible without performing a user authentication,
wherein the privacy safe installation-mode video stream is generated by image processing a first video stream such that a person in the first video stream is anonymized in the privacy safe installation-mode video stream, and
wherein the limited set of persistent software settings that can be changed in the installation mode relate to the installation mode.

* * * * *